United States Patent [19]
Wei

[11] Patent Number: 5,007,306
[45] Date of Patent: Apr. 16, 1991

[54] CRANKSHAFTS WITHOUT TORSIONAL VIBRATION RESONANCE

[76] Inventor: Yun S. Wei, 6501 Stewart Rd., Apt. 13, Cincinnati, Ohio 45236

[21] Appl. No.: 423,939

[22] Filed: Oct. 19, 1989

Related U.S. Application Data

[63] Continuation-in-part of Ser. No. 866,937, May 27, 1986, which is a continuation-in-part of Ser. No. 584,005, Feb. 27, 1984, abandoned, which is a continuation-in-part of Ser. No. 366,486, Apr. 8, 1982, abandoned.

[51] Int. Cl.⁵ .................................................. F16C 3/04
[52] U.S. Cl. ........................................... 74/595; 74/604
[58] Field of Search .................................. 74/595–604

[56] References Cited

U.S. PATENT DOCUMENTS

| 286,404 | 10/1883 | Dowes | 74/598 |
|---|---|---|---|
| 1,254,159 | 1/1918 | Riedler | 74/595 |
| 1,549,996 | 8/1925 | Liebowitz | 29/6 |
| 1,908,071 | 5/1933 | Snyder | 74/598 |
| 2,182,228 | 12/1939 | Groene et al. | 29/6 |
| 2,333,859 | 11/1943 | Groene | 29/6 |
| 3,132,906 | 5/1964 | Sternlicht | 384/114 |
| 3,257,865 | 6/1966 | Seulen et al. | 74/595 |
| 3,309,941 | 3/1967 | Kappel | 74/597 |
| 3,388,616 | 6/1968 | Kume | 74/597 |
| 4,235,481 | 11/1980 | Fukuoka et al. | 384/431 |

FOREIGN PATENT DOCUMENTS

| 2126059 | 5/1971 | Fed. Rep. of Germany | 123/192 B |
|---|---|---|---|
| 781788 | 8/1957 | United Kingdom | 74/595 |

OTHER PUBLICATIONS

Practical Solution of Torsional Vibration Problems, W. Ker Wilson, 2nd Edition, 1940, pp. 8–13.
Elements of Strength of Materials, S. Timoshenko & D. H. Young, 5th Edition, 1968, pp. 182–185.

Primary Examiner—Vinh T. Luong

[57] ABSTRACT

A crankshaft used in piston engines has vibration and noise level normally associated therewith substantially reduced. The natural frequencies of torsional vibration of individual cranks are made unequal by making main journals of different outside diameters.

3 Claims, 1 Drawing Sheet

CRANKSHAFTS WITHOUT TORSIONAL VIBRATION RESONANCE

This application is a continuation-in-part application for "Crankshafts without Torsional Vibration Resonance," Ser. No. 06/866,937 filed May 27, 1986, which is a continuation-in-part application of "Crankshafts without Torsional Vibration Resonance," Ser. No. 06/584,005 filed Feb. 27, 1984, now abandoned, which is a continuation-in-part application of "Randomization of Natural Frequencies and/or Excitation in/of Machineries, Equipments and/or Structures," Ser. No. 06/366,486, filed Apr. 8, 1982, now abandoned.

BACKGROUND OF THE INVENTION

Piston engine could be one of the most popular and important machineries the human ever made. Yet the vibration problem of piston engines is also well-known and detrimental. Among bending and torsional vibration, the later is more pronounce. It results of early failure and low quality of functioning of engine members, which include for example rear flexible coupling, front accessory drive belt, transmission gears, valve timing and finally, the itself crankshaft—the backbone of the engine which handles the entire power output of the engine.

SUMMARY OF THE INVENTION

It has been found that one of the main reasons of torsional vibration of piston engines is the torsional vibration resonance due to identical geometries of the cranks of prior art crankshafts.

As described fully hereinafter, there has now been found a means by which the torsional vibration resonance associated with crankshafts of piston engines can be eliminated, and hence the power level of vibration of the piston engines be substantially reduced.

DESCRIPTION OF THE PREFERRED EMBODIMENT

Figure 1:
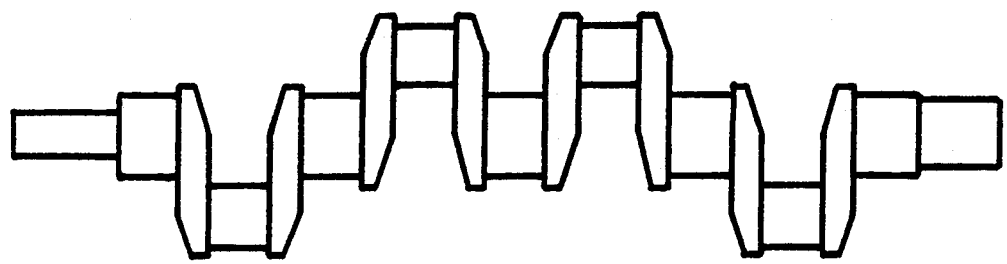
FIG. 1 is a side view of a crankshaft of prior art having main journals of equal outside diameters.
Figure 2:
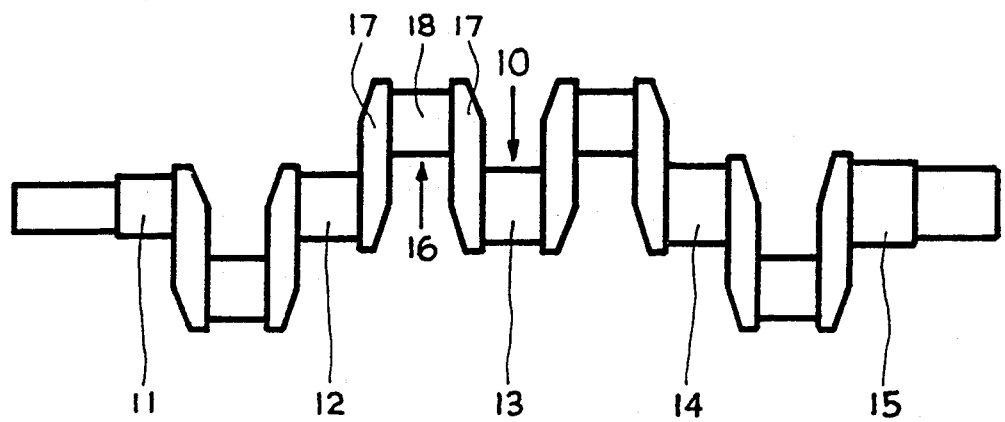
FIG. 2 is a side view of a crankshaft of present invention having main journals of unequal outside diameters.

With reference to FIG. 2, a crankshaft 10 is comprised of main journals 11, 12, 13, 14 and 15 and cranks 16. Each crank has a pair of throws 17 and crankpin 18. As shown in FIG. 2, in the present invention, the outside diameters of the main journals are no longer the same as in FIG. 1. Since the natural frequency of torsional vibration of the crank is proportional to the square root of the rigidity of the crank, and the later is basically (with minor modification of crankshafts having hollow main journals) proportional to the fourth power of the outside diameter of the main journal, it follows that the natural frequency of torsional vibration of the crank is basically proportional to the square of the outside diameter of the main journal. Since the outside diameters of the main journals are different in accord with the present invention, the natural frequencies of torsional vibration of individual cranks are also different and hence torsional vibration resonance is avoided.

For best results, the natural frequencies of torsional vibration of the cranks are arranged in an increasing geometric progression from the frontmost main journal of the rearmost main journal with a common ratio of frequency increment (see next paragraph for explanation). The ratio of natural frequencies of torsional vibration of any crank behind the frontmost crank to its preceeding adjacent crank preferably ranges from 1.05 to 1.25.

The outside diameters of main journals 11-15 of crankshaft 10 are also judged from the point of view of the combined normal and shear stresses in the outer fibers of the main journals. For best utilization of material, it is desired that the maximum combined normal and shear stresses in the outer fibers for each of the main journals be equalized. The maximum normal stress induced in the outer fiber of each main journal is substantially the same and is independent of the location of the main journal along the length of the crankshaft. However, the shear stresses on the main journals result from the torque applied by the engine are accumulated along the length of the crankshaft from the frontmost main journal to the rearmost main journal. Because the shear stresses are dependent on the main journal diameters, the maximum combined normal and shear stresses of each journal of the prior art crankshaft will not be the same since the diameters of each main journal are the same. Contrary to this and in accord with the present invention, the maximum combined normal and shear stresses in the outer fibers for each of the main journals are possible to be made equal by making the diameters of main journals different. As shown in FIG. 2, the diameters of main journals 11-15 increase progressively from the frontmost main journal to the rearmost journal.

The present invention applies for both solid and hollow crankshafts. While the drawings and specification for the invention has been described with reference to a crankshaft used for a 4-in-line or V-8 engine for convenience, it is to be understood that the invention is useful as well with other types of piston engines.

The invention is, of course, not limited to the specific embodiments described and illustrated, but may be realized in various modifications and substitutions without departing from the spirit and scope of the appended claims.

I claim:

1. In a piston engine crankshaft having main journals and cranks, the improvement comprises whereas the ratio of natural frequencies of torsional vibration of at least one crank behind the frontmost crank to its preceeding adjacent crank ranging from 1.05 to 1.25 by making the outside diameters of at least one pair of the adjacent main journals different to one another.

2. An improvement according to claim 1, whereas the outside diameters of the main journals being determined according to the principle of equal maximum combined normal and shear stresses in the outer fibers of the main journals.

3. An improvement according to claim 2, whereas the natural frequencies of torsional vibration of the cranks being arranged in an increasing geometric progression from the frontmost main journal to the rearmost main journal.

* * * * *